United States Patent [19]
Eltze

[11] 3,882,739
[45] May 13, 1975

[54] DRIVE UNIT WITH AN INTERNAL COMBUSTION ENGINE AND WITH AN AUTOMATIC CHANGE-SPEED TRANSMISSION CONNECTED IN THE OUTPUT THEREOF

[75] Inventor: Georg Eltze, Stuttgart, Germany

[73] Assignee: Daimler-Benz Aktiengesellschaft, Stuttgart, Germany

[22] Filed: Nov. 16, 1972

[21] Appl. No.: 307,198

[30] Foreign Application Priority Data
Nov. 17, 1971 Germany............................ 2157028

[52] U.S. Cl.................................. 74/867; 74/863
[51] Int. Cl............................................ B60k 23/00
[58] Field of Search ............ 74/856, 858, 863, 864, 74/867, 843; 192/3.58; 123/117 A

[56] References Cited
UNITED STATES PATENTS

| | | | |
|---|---|---|---|
| 2,955,482 | 10/1960 | Winchell | 74/856 |
| 3,121,342 | 2/1964 | Breting et al. | 74/858 |
| 3,238,806 | 3/1966 | Mullaney | 74/843 |
| 3,303,912 | 2/1967 | Fujimoto | 192/3.58 |
| 3,410,159 | 11/1968 | Zundel | 74/863 |
| 3,687,120 | 8/1972 | Lenz | 123/117 A |
| 3,688,606 | 9/1972 | Lemieux | 74/863 |
| 3,731,558 | 5/1973 | Enomoto | 74/867 |
| 3,748,931 | 7/1973 | Schaefer et al. | 74/867 |
| 3,765,272 | 10/1973 | Kolehmainen et al. | 74/863 |

*Primary Examiner*—Samuel Scott
*Assistant Examiner*—P. S. Lall
*Attorney, Agent, or Firm*—Craig & Antonelli

[57] ABSTRACT

A drive unit equipped with an internal combustion engine and with an automatic change-speed transmission connected in the output of the engine, in which the vacuum in the suction pipe of the internal combustion engine operating with externally controlled ignition varies with engine load, and in which a modulating control magnitude influenced by the vacuum for the control of the shifting servo-motors and/or for changing shifting the servo-force is utilized in the change-speed transmission as a function of the engine load; in case of an ignition adjustment toward a "delayed" ignition for purposes of decontamination of the exhaust gases, the modulating control magnitude is correspondingly influenced to provide a modulating control magnitude corresponding to the reduction of the engine torque which has been established as a result of the adjustment of the ignition toward a "delayed" ignition.

12 Claims, 1 Drawing Figure

PATENTED MAY 13 1975　　　　　　　　　　　　　3,882,739
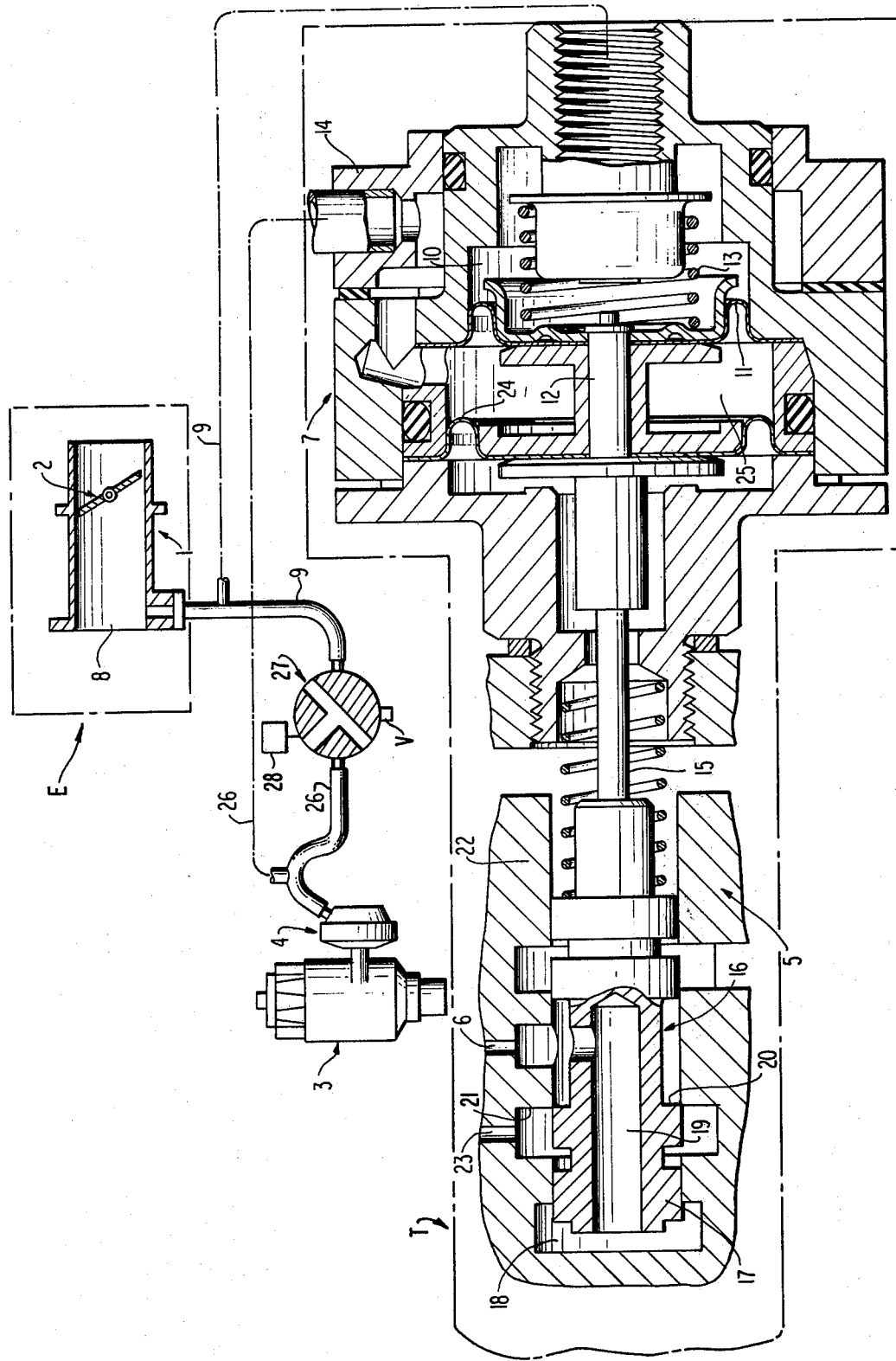

DRIVE UNIT WITH AN INTERNAL COMBUSTION ENGINE AND WITH AN AUTOMATIC CHANGE-SPEED TRANSMISSION CONNECTED IN THE OUTPUT THEREOF

The present invention relates to a drive unit with an internal combustion engine and with an automatic change-speed transmission connected in the output thereof, in which the vacuum in the suction pipe of the internal combustion engine operating with externally controlled ignition varies with the engine load, and in which a modulating control magnitude influenced by the vacuum is utilized in the change-speed transmission for the control of the shifting servo-motors and/or for the change of the shifting servo-force in dependence on the engine load.

In drive units of this type, it is difficult to maintain the accurate coordination of the transmission ratios to the engine load when, for purposes of the exhaust gas decontamination, the ignition is adjusted toward "delayed" in critical operating ranges. As is known, the engine torque produced by the engine changes or decreases in this case, whereas the suction pipe vacuum remains uninfluenced. As a result thereof, the modulating control magnitude adjusted by the vacuum no longer corresponds to the reduced engine torque.

The present invention is concerned with the task to provide a drive unit of the aforementioned type in which the load-dependent control of the change-speed transmission is corrected also when, as a result of an ignition adjustment toward "delayed," the changed engine torque no longer corresponds to the uninfluenced suction pipe vacuum.

The underlying problems are solved according to the present invention in that an influencing of the modulating control magnitude corresponding to the decrease of the engine torque which establishes itself by the aforementioned ignition adjustment, is coupled with the ignition adjustment toward "delayed" ignition that is realized for the purpose of exhaust gas decontamination.

The present invention avoids the aforementioned underlying problems and is susceptible of several solutions. Thus, it is feasible within the scope of the present invention to form, in addition to the first modulating control magnitude which is continuously adjusted by the vacuum, a second modulating control magnitude initiated or triggered by the ignition adjustment toward "delayed" and to cause both modulating control magnitudes to act on an adding or summation (logic) element which, in its turn, adjusts a summation magnitude corresponding to an increased vacuum or a reduced torque.

One embodiment of the present invention is directed to such a drive unit of the type involved in the present invention, in which the control device for the modulating control magnitude so cooperates with a first piston surface acted upon continuously by the vacuum that with an increasing vacuum, a reduction and with a decreasing vacuum an increase of the modulating control magnitude takes place. In the application of the present invention to such a drive unit, the arrangement may be made in such a manner that a second piston surface for the control device which second piston surface is adapted to be acted upon by the vacuum and which cooperates with the first piston surface in the same direction, is additionally put into operation together with the first piston surface with an ignition adjusted toward "delayed" ignition.

The ignition distributor of the internal combustion engine can be equipped with a vacuum adjusting device, for example, in the form of an adjusting motor of conventional construction, whose vacuum chamber is connected in the position "delayed" of the ignition distributor with the suction pipe and in the position "normal or advanced" with the atmosphere. In order to synchronize the interconnection of the second piston surface with the shifting of the adjusting motor in a simple manner, without having to provide separate special control means for that purpose, provision is made according to the present invention that the vacuum chamber of the adjusting motor of the ignition distributor is in free communication with the vacuum chamber of the second piston surface.

In one advantageous embodiment of the drive unit according to the present invention, which is advantageous for the structural arrangement of the two piston surfaces in a common housing, a twin diaphragm adjusting motor acting on the adjusting member of the control device for the modulating control magnitude is additionally proposed, onto the adjusting member of which are clamped two piston diaphragms at a distance to one another, and in which one vacuum chamber each is formed between the one piston diaphragm and the adjusting motor wall as also between the two piston diaphragms, of which the one vacuum chamber is in communication with the suction pipe and the other with the vacuum chamber of the adjusting motor of the ignition distributor.

Accordingly, it is an object of the present invention to provide a drive unit with an internal combustion engine and an automatic changespeed transmission connected in the output thereof which avoids by simple means the aforementioned shortcomings and drawbacks encountered in the prior art.

Another object of the present invention resides in a drive unit of the aforementioned type which permits to maintain the accurate coordination of the transmission ratio in the change-speed transmission to the engine load even if the ignition is adjusted to a delayed ignition for avoiding exhaust gas contamination.

A further object of the present invention resides in a drive unit with an internal combustion engine and with an automatic change-speed transmission connected in the train of power flow from the engine which assures a modulating control magnitude used in the transmission that corresponds at all times to the torque produced by the engine regardless of adjustment in the ignition system.

A still further object of the present invention resides in a drive unit achieving the aforementioned aims and objects by simple means which eliminates the need of special control means.

These and further objects, features and advantages of the present invention will become more apparent from the following description when taken in connection with the accompanying drawing which shows, for purposes of illustration only, one embodiment in accordance with the present invention, and wherein:

The single is a schematic view of one embodiment of a control installation in accordance with the present invention; and Referring now to the single of the drawing, a drive unit consisting of an injection-type internal combustion engine, generally designated by the reference character E having a schematically indicated valve connection generally designated by reference numeral 1 disposed at the inlet of the line system for the sucked-in combustion air throttle valve 2 is disposed within the valve connection 1 and an ignition distributor generally designated by reference numeral 3 with the vacuum-adjusting motor generally designated by reference numeral 4 is provided for the ignition adjustment of the internal combustion engine.

An automatic change-speed transmission schematically illustrated and generally designated by the reference character T is connected in a conventional manner the output of the injection internal combustion engine E. The automatic change-speed transmission T is provided with a control installation a control slide valve generally designated by reference numeral 5 for the modulating pressure (modulating pressure line 6) and with a twin-diaphragm adjusting motor generally designated by reference numeral 7 and cooperating with the control slide valve 5.

The line portion 8 of the valve connection 1 which lies between the throttle valve 2 and the combustion spaces is connected continuously by way of a first vacuum line 9 with a first vacuum chamber 10 of the adjusting motor 7. A piston diaphragm 11 operates in the vacuum chamber 10 whose center portion is coaxially clamped onto an adjusting bolt 12. The adjusting bolt 12 is supported at one end against the housing 14 of the adjusting motor 7 by way of an adjusting spring 13 and at the other end at the adjusting bolt or piston generally designated by reference numeral 16 of the control slide valve 5 by way of a plunger 15. The end 17 of the adjusting piston 16 opposite the plunger 15 projects into a pressure chamber 18 which is in communication with the modulating pressure line 6 by way of a central piston channel 19. As a result thereof, the modulating pressure is in equilibrium with the adjusting force of the adjusting bolt 12. The adjusting bolt or piston 16 is provided with a control edge 20 which cooperates with a counter edge 21 of the slide valve housing 22. The control edges 20 and 21 control the connection between a high pressure line 23 and the modulating pressure line 6. With a high engine load, the vacuum approaches zero, consequently, the diaphragm acts in the same direction as the bias of the adjusting spring 13 so that a high modulating pressure is adjusted. With a stronger vacuum (corresponding to a lower load), the piston diaphragm 11 acts opposite the bias of the spring 13 so that a lower modulating pressure is adjusted. The modulating pressure serves, inter alia, for the load-dependent control of control slide valves which initiate or trigger the shifting-up or shifting-down operations of the change-speed transmission.

A second piston diaphragm 24 is clamped onto the adjusting bolt 12 whose vacuum chamber 25 is in communication by way of a second vacuum line 26 with the vacuum chamber of the adjusting motor 4 for the ignition adjustment.

A conventional 2/3-way shifting valve generally designated by reference numeral 27 is interconnected between the two vacuum lines 9 and 26, which is adapted to be moved into two shifting positions and is provided with one connection each for the lines 9 and 26 as well as with a vent connection. In the normal position (zero position) of the shifting valve 27, the line 26 is connected with the vent connection whereas in the other shifting position, the line 26 is connected with the line 9. Correspondingly, the ignition distributor 3 is in its position "advanced or normal" in the normal position of the shifting valve 27 whereas it is in its position "delayed" in the other shifting position of the shifting valve 27.

The control section 28 of the shifting valve 27 can be operatively connected with feeler or sensing devices of conventional construction for the rotational speed and the operating temperature of the internal combustion engine. The arrangement may be made thereby in such a manner that at rotational speeds up to 2,000 r.p.m., the ignition distributor is shifted to "delayed" whereas with cooling water temperatures above 100°C., the ignition is readjusted to "advanced or normal."

The average combustion pressure in the cylinders decreases by adjustment of the ignition toward "delayed" and therewith also the produced torque whereas the pressure condition in the line section 8 remains uninfluenced. Consequently, the piston diaphragm 11, if it remained effective alone, would adjust a modulating pressure which would be excessive with respect to the decreased torque with an ignition adjustment toward "delayed." For that reason, with this ignition adjustment toward "delayed" the second piston diaphragm 24 is put into operation in addition to the first piston diaphragm 11 (by way of the line 26) so that a lower modulating pressure is adjusted corresponding to the effect of the additional diaphragm.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A drive unit arrangement with an internal combustion engine, an automatic change-speed transmission connected in the output of the internal combustion engine, an externally controlled ignition for operating the internal combustion engine, a suction pipe provided on the internal combustion engine in which the vacuum varies with the engine load, the change-speed transmission including shifting means for controlling the shifting operation in dependence on the engine load, a modulating pressure means influenced by the vacuum in the suction pipe for effecting the shifting operation, the arrangement comprising: ignition-adjusting means for adjusting the ignition for "delayed" ignition for the purposes of exhaust decontamination, and means operatively connected with said ignition-adjusting means for controlling the magnitude of the modulating control pressure upon adjustment of said ignition adjustment means toward "delayed" to correspond to the reduction of the engine torque which occurs as a result of the ignition adjustment.

2. A drive unit arrangement according to claim 1, wherein said control means includes a first piston surface means operatively connected with the suction pipe and continuously acted upon by the vacuum therefrom, said first piston surface means being responsive to increases and decreases in the vacuum from the suction pipe to result in reducing and increasing, respectively, the magnitude of the modulating control pressure, a second piston surface means operatively connected with said first piston surface means, adapted to be acted upon by the vacuum, said second piston surface means operating in the same direction as said first piston surface means, said first piston surface means and said second piston surface means operating in unison upon adjustment of said ignition adjusting means toward "delayed" ignition.

3. A drive unit arrangement according to claim 2, wherein said piston surface means are constituted by piston diaphragms.

4. A drive unit arrangement according to claim 3, wherein said control means for controlling the magnitude of the modulating control pressure includes a control slide valve means.

5. A drive unit arrangement according to claim 1, wherein the modulating control pressure means includes a modulating pressure line.

6. A drive unit arrangement according to claim 2, wherein said ignition adjustment means includes an ignition distributor means for the internal combustion engine, a vacuum-adjusting motor connected with said ignition distributor means, said vacuum-adjusting motor being provided with a vacuum chamber, means for operatively connecting the suction pipe with said vacuum chamber when said ignition distributor means is in a "delayed" position and for connecting said vacuum chamber with the atmosphere when said ignition distributor means is in a "normal or advanced" position, and means for freely communicating said vacuum chamber with said second piston surface means.

7. A drive unit arrangement according to claim 6, wherein said control means includes an adjusting member and a twin-diaphragm-adjusting means operatively connected with said adjusting member, said twin diaphragm-adjusting means having an adjusting member and two piston diaphragms, said two piston diaphragms forming a portion of said first and second piston surface means, said two piston diaphragms being spaced at a distance from one another and clamped onto said last-mentioned adjusting member, and wherein a vacuum chamber is formed between one piston diaphragm and the walls of said diaphragm adjusting means, and a second vacuum chamber is formed in the space between said two piston diaphragms, one of said vacuum chambers being operatively connected with the suction pipe and the other with said vacuum chamber of said adjusting motor of the ignition distributor means.

8. A drive unit arrangement according to claim 7, wherein said adjusting member of said control means is a control slide valve means.

9. A drive unit arrangement according to claim 8, wherein said control slide valve means includes an adjusting piston.

10. A drive unit arrangement according to claim 9, wherein said adjusting member of said twin diaphragm-adjusting means is an adjusting bolt.

11. A drive unit arrangement according to claim 2, wherein said ignition adjusting means includes an ignition distributor means, and wherein said control means includes an adjusting member and a twin-diaphragm-adjusting means operatively connected with said adjusting member, said twin diaphragm-adjusting means having an adjusting member and two piston diaphragms, said two piston diaphragms constituting a portion of said first and second piston surface means, said two piston diaphragms being spaced at a distance from one another and clamped onto said last-mentioned adjusting member, and wherein a first vacuum chamber is formed between one piston diaphragm and the walls of said diaphragm adjusting means, a second vacuum chamber is formed in the space between said two piston diaphragms, one of said vacuum chambers being operatively connected with the suction pipe and the other with said ignition distributor means.

12. A drive unit arrangement which includes an internal combustion engine, an automatic change-speed transmission connected in the output of the internal combustion engine, a vacuum means provided on the engine, means varying the vacuum in dependence upon the engine load, the change-speed transmission including automatic shifting means, modulating pressure means responsive to the engine load, the engine being further provided with an ignition distributor means and adjusting means for adjusting the engine ignition for "delayed" ignition for purposes of decontamination of the exhaust gases under certain circumstances resulting in a decrease of the engine torque, the arrangement comprising: means for controlling the magnitude of the modulating pressure, means operatively connected with said control means for operating the same to provide a modulating pressure corresponding to the reduction of the engine torque established by the adjusting means when the latter adjusts the ignition to "delayed" ignition.

* * * * *